US009985992B1

(12) United States Patent
Luce, Jr.

(10) Patent No.: US 9,985,992 B1
(45) Date of Patent: May 29, 2018

(54) ENTITLEMENT SYSTEM AND METHOD (71) Applicant: JPMorgan Chase Bank, N.A., New York, NY (US)

(72) Inventor: David L. Luce, Jr., Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 97 days.

(21) Appl. No.: 14/490,943

(22) Filed: Sep. 19, 2014

(51) Int. Cl.
*G06F 3/00* (2006.01)
*H04L 29/06* (2006.01)

(52) U.S. Cl.
CPC ............. *H04L 63/20* (2013.01); *H04L 63/10* (2013.01)

(58) Field of Classification Search
CPC ............... G06F 17/2247; G06F 17/227; H04L 67/1002; H04L 67/1006
See application file for complete search history.

(56) References Cited

U.S. PATENT DOCUMENTS

| 5,699,514 | A  | * | 12/1997 | Durinovic-Johri | ..... | G06F 21/31 340/5.31 |
| 6,286,138 | B1 | * | 9/2001  | Purcell          | ...... | G06F 8/65 709/203 |
| 6,654,745 | B2 | * | 11/2003 | Feldman          | ................ | G06F 9/468 |
| 7,054,923 | B2 | * | 5/2006  | Krishnamoorthy   | ........................ G06F 17/30867 707/999.01 |
| 7,313,826 | B2 | * | 12/2007 | Reasons          | .................. G06F 21/10 713/168 |
| 7,392,546 | B2 | * | 6/2008  | Patrick          | ................ G06F 21/6245 709/217 |
| 7,403,925 | B2 |   | 7/2008  | Schlesinger et al. | |
| 7,467,414 | B2 | * | 12/2008 | Schlesinger      | ........ G06F 21/6218 707/999.001 |
| 7,515,712 | B2 | * | 4/2009  | Wasilewski       | ......... H04L 63/0428 380/210 |

(Continued)

*Primary Examiner* — Joseph P Hirl
*Assistant Examiner* — Sayed Beheshti Shirazi
(74) *Attorney, Agent, or Firm* — Hunton Andrews Kurth LLP (57) ABSTRACT

The invention relates to a computer-implemented system and method for controlling access by users of an organization to one or more components of a computer application. The method may be conducted on a specially programmed computer system comprising one or more computer processors, electronic storage devices, and networks. The method may comprise the steps of storing, in an electronic entitlement database, an enumeration that identifies the plurality of components of the application; storing, in the electronic entitlement database, an electronic lookup table containing entitlement data that specifies access rights to the plurality of components for a user or a defined group of users; receiving from a user computing device a request for access to at least one of the plurality of components of the application; transmitting to the electronic entitlement database a security ID (SID) of the user and an application ID; generating an electronic bit string specifying access to the plurality of components of the application based on the SID and the application ID; transmitting the bit string to the application; and granting access or denying access to the user computing device to the requested component of the application based on the bit string.

15 Claims, 7 Drawing Sheets

(56) References Cited

U.S. PATENT DOCUMENTS

| | | | | |
|---|---|---|---|---|
| 7,669,246 B2* | 2/2010 | Jorgenson | ............ | G06Q 30/012 707/783 |
| 7,703,667 B2* | 4/2010 | Koorland | ........... | G06Q 10/0633 235/375 |
| 7,779,091 B2 | 8/2010 | Wilkinson et al. | | |
| 8,095,785 B2 | 1/2012 | DeFreese et al. | | |
| 8,132,231 B2* | 3/2012 | Amies | ..................... | H04L 67/02 726/1 |
| 8,386,388 B2 | 2/2013 | Schlesinger et al. | | |
| 8,473,961 B2* | 6/2013 | Krsti | ....... | G06F 21/10 718/104 |
| 8,561,151 B2* | 10/2013 | Dorsey | ................. | G06F 21/105 705/59 |
| 8,838,734 B2* | 9/2014 | Allamaraju | ............ | G06Q 10/00 709/201 |
| 9,154,507 B2* | 10/2015 | Ashley | ................. | G06F 21/552 |
| 2004/0186809 A1* | 9/2004 | Schlesinger | ........ | G06F 21/6218 705/50 |
| 2006/0059546 A1* | 3/2006 | Nester | ................. | H04L 63/0815 726/5 |
| 2008/0060058 A1* | 3/2008 | Shea | ..................... | G06F 21/604 726/4 |
| 2009/0034743 A1* | 2/2009 | De Petris | ................ | G06F 21/10 380/285 |
| 2009/0249071 A1* | 10/2009 | De Atley | ............ | G06F 21/6218 713/171 |
| 2010/0268830 A1* | 10/2010 | McKee | ................. | G06Q 10/10 709/228 |
| 2012/0096364 A1 | 4/2012 | Wilkinson et al. | | |
| 2012/0278903 A1* | 11/2012 | Pugh | ..................... | G06F 21/604 726/28 |
| 2012/0330786 A1* | 12/2012 | Paleja | .................... | G06Q 30/02 705/26.41 |
| 2013/0312068 A1* | 11/2013 | Mortimore | .............. | H04L 63/10 726/4 |
| 2013/0326492 A1* | 12/2013 | Hunt | .................. | G06F 9/44521 717/163 |
| 2014/0109168 A1 | 4/2014 | Ashley et al. | | |
| 2015/0089623 A1* | 3/2015 | Sondhi | .................... | H04L 63/08 726/9 |
| 2015/0106500 A1* | 4/2015 | Fakhouri | ................ | H04L 67/34 709/224 |

* cited by examiner

```
public enum SecurityFunctions
    {
        // The security is set up as application then a string of 0's and 1's.
        // The number in the enum is the position in that list of 0's and 1's
        // The logic to break apart the access is in this class - "GetAccess"
        CanAccess = 0,              // Can access the page
        AccessToAllOrg = 1,         // These are admins and HRBPs
        IsARegionalManager = 2 ,
        IsAMarketManager = 3,
        IsADistrictManager = 4,
        IsABranchManager = 5,
        AllowSaveOnMainPage = 6,
        ReportingAccess = 7,
        CanChangeMODAfterSelected = 8,
        CanUpload = 9,
        EveryoneHasAccess = 100,
    }
```

Figure 3

```
public bool CheckAccess(EmployeeAccess.SecurityFunctions AccessToCheck)
{
    // The security value is part of the employee class which has already been instantiated in this class.
    int accessPos = (int)AccessToCheck;

// First check to see if everyone has access.  If this is the case there is no need to check the access
security bytes string
    if (AccessToCheck == EmployeeAccess.SecurityFunctions.EveryoneHasAccess)
        return true;

if (_emp.SecurityValue.Length > accessPos)
    {
        // 1 means the employee has access to the particular security piece. 0 means they do not
        if (_emp.SecurityValue.Substring(accessPos, 1) == "1")
            return true;
    }
    else
        _message = String.Format("The security value is not long enough. Currently it is set at {0} characters.", _emp.SecurityValue.Length.ToString());

return false;
}
```

Figure 4

```
// See if they have the ability to save any information, if not, remove the button
if (_biz.CheckAccess(EmployeeAccess.SecurityFunctions.AllowSaveOnMainPage) == true)
    cmdSaveCC.Visible = true;
```

| AppID | ObjectID | AppDescription |
|---|---|---|
| 12 | 12 | HR Selection Tool |

Figure 7

| ObjectID | ObjectModelID | ObjectName | ObjectDescrip | ObjectMaintenance |
|---|---|---|---|---|
| 12 | 1 | HR Selection Tool | Manager On Duty | 0 |

Figure 8

| AppID | FuncID | FuncOrder | Descrip |
|---|---|---|---|
| 12 | 0 | 0 | CanAccess Main Page |
| 12 | 1 | 1 | AccessToAllOrg |
| 12 | 2 | 2 | IsARegionalManager |
| 12 | 3 | 3 | IsAMarketManager |
| 12 | 4 | 4 | IsADistrictManager |
| 12 | 5 | 5 | IsABranchManager |
| 12 | 6 | 6 | AllowSaveOnMainPage |
| 12 | 7 | 7 | ReportingAccess |
| 12 | 8 | 8 | CanChangeMODAfterSelected |
| 12 | 9 | 9 | CanUpload |

Figure 9

| ObjectID | SearchByValue | SecurityString | AddedBySID | DateAdded |
|---|---|---|---|---|
| 12 | 100003 | 1000101100 | 1234567 | 2014-07-05 18:01:11 |
| 12 | 100005 | 1000011100 | 1234567 | 2014-07-05 18:01:11 |
| 12 | 100119 | 1001001100 | 1234567 | 2014-07-05 18:01:11 |
| 12 | 123456 | 1010001100 | 1234567 | 2014-07-05 18:01:11 |

Figure 10

| SID | AppID | AddedBySID | DateAdded |
|---|---|---|---|
| J001068 | 12 | J001068 | 2014-07-05 18:16:31.460 |

Figure 11

| ObjectID | SID | DelegateForSID | AddedBySID | DateAdded |
|---|---|---|---|---|
| 12 | 0123456 | 1234567 | 2345678 | 2014-07-05-18:22.02 |

Figure 12

| ModelID | Descrip |
|---|---|
| 0 | SID Only |
| 1 | Job Code Only |
| 2 | Cost Center Only |
| 3 | MailCode Only |
| 4 | Job Code / Cost Center |

Figure 13

ENTITLEMENT SYSTEM AND METHOD

FIELD OF THE INVENTION

The invention relates generally to managing entitlements to computer applications, and more particularly to a system and method for enabling an administrator to easily update user or group entitlements to access a computer application or designated components of an application.

BACKGROUND

In companies and organizations that use multiple computer applications (sometimes referred to as "apps") and proprietary data, it is important to carefully control access to such resources. Granting individual employees only the access necessary to carry out their respective roles and responsibilities enhances the company's effectiveness at managing the security of its proprietary applications and data.

According to one known system, a central database is used to store multiple entitlement profiles with a lightweight directory access protocol (LDAP). Each LDAP profile may comprise an alphanumeric code associated with the users that are permitted to access an entire application or portions of an application. In such a system, however, it can be somewhat cumbersome to manage and modify entitlements for a particular application, particularly when there are multiple users who need different access rights to various groups of components of the application. For example, if an application developer wishes to grant a user access to a unique group of components of an application, the application developer may need to create a new LDAP profile identifying the relevant group of components associated with the user. The application developer would then need to add the user to this newly created LDAP profile in order for the user to gain access to those components. Creation of the LDAP profile and adding the new user to the LDAP profile can be time consuming because the LDAP is generally maintained on a different server than the application, and by a different administrator than the application developer. Once the LDAP profile is set in code, and the user's ID is added to the LDAP profile, the application then queries the central LDAP server to determine if the end user has access to the application. The process may take several days to complete due to the need to create a new LDAP profile and to use different systems to grant the appropriate access to the user. The process can be overly time consuming for an application developer or other administrator needing to frequently grant various users different entitlements to applications. Another disadvantage of LDAP is that there may be many different LDAP profiles required for an application to be properly secured if there are many individuals or groups accessing the application.

It would be advantageous, therefore, to have an entitlement system that allowed for rapid updating of entitlements to an application and components of the application, and that avoided other drawbacks such as the need to maintain many different LDAP profiles.

SUMMARY

According to one embodiment, the invention relates to a computer-implemented method for controlling access by users of an organization to one or more components of a computer application. The method may be conducted on a specially programmed computer system comprising one or more computer processors, electronic storage devices, and networks. The method may comprise the steps of storing, in an electronic entitlement database, an enumeration that identifies the plurality of components of the application; storing, in the electronic entitlement database, at least one electronic lookup table containing entitlement data that specifies access rights to the plurality of components for a user or a defined group of users; receiving from a user computing device a request for access to at least one of the plurality of components of the application; transmitting to the electronic entitlement database a security ID (SID) of the user and an application ID; generating an electronic bit string specifying access to the plurality of components of the application based on the SID and the application ID; transmitting the bit string to the application; and granting access or denying access to the user computing device to the requested component of the application based on the bit string.

According to other embodiments, the invention relates to a computer-implemented system for controlling access by users of an organization to one or more components of a computer application, and to a computer readable medium containing program instructions for executing a method for controlling access by users of an organization to one or more components of a computer application.

The computer implemented method, system and computer readable medium described herein can provide the advantage of allowing an administrator, such as an application developer, to easily and quickly create customized entitlements to specified components of an application, thus allowing specified users or groups to access those rights promptly. Another advantage that various embodiments of the system and method can provide is the ability to distribute reports to specified individuals or groups according to the bit string. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to be an example of an embodiment of the invention.

DETAILED DESCRIPTION OF THE PREFERRED EMBODIMENTS

Figure 1:
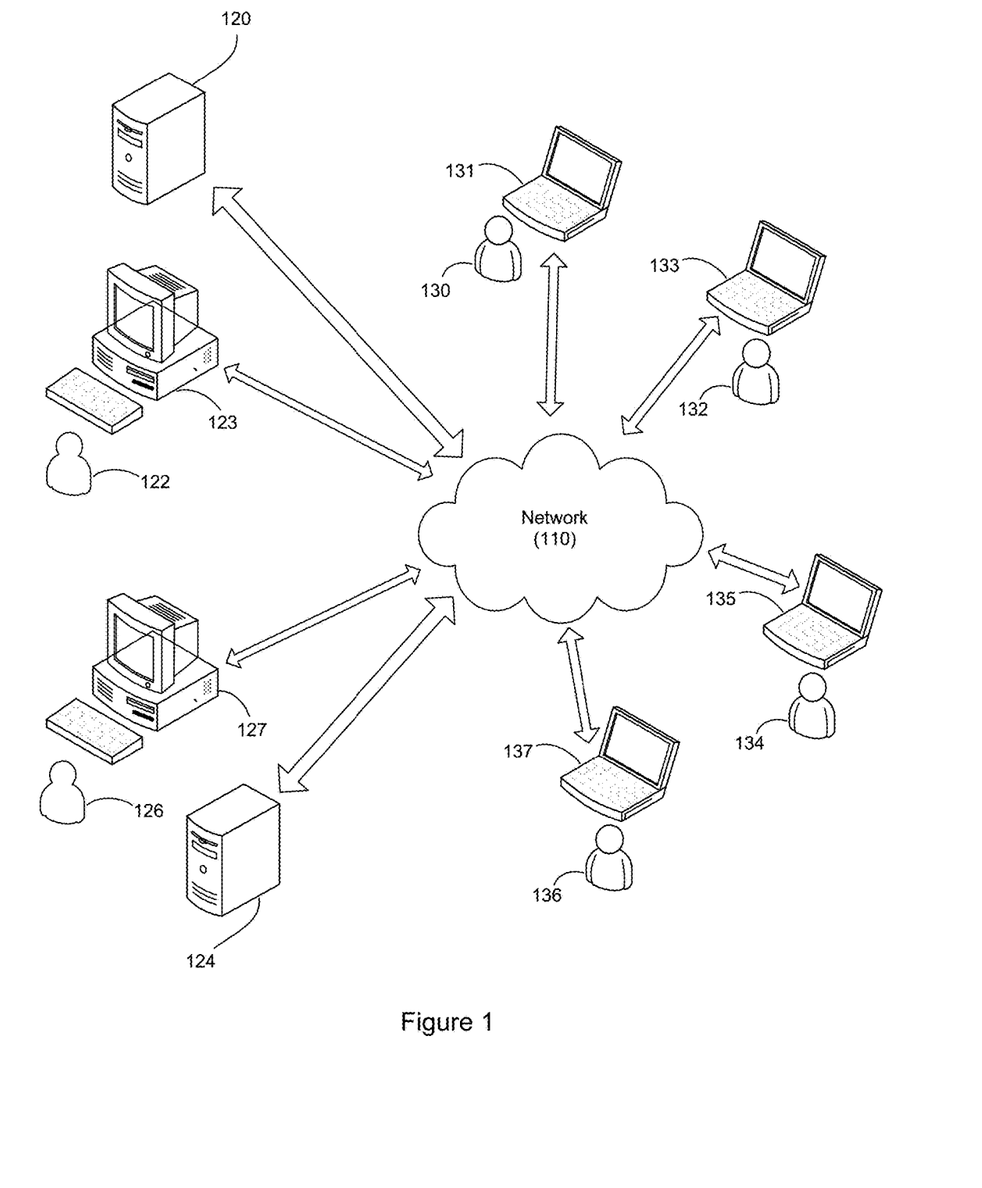
FIG. 1 is a diagram of an entitlement system for controlling access to applications and components of applications, according to an exemplary embodiment of the invention.

FIG. 1 is a diagram of an entitlement system according to one embodiment of the invention. As shown in FIG. 1, the system includes a network 110 which may comprise one or more of a local area network (LAN), a wide area network (WAN), an intranet and/or the Internet, for example. The network 110 enables communications between various computing and storage devices in the system.

The system also includes one or more application servers that may be used to provide access to various computer applications or discrete components of such applications. FIG. 1 shows a first application server 120 that may provide access to applications to various authorized users on the network. The application server 120 may store one or more applications, one or more entitlement databases associated with the applications, and other proprietary data or information. The access rights to applications stored on the server 120 can be controlled by an administrator 122 using a desktop computer or other type of personal computing device 123, such as a laptop computer, tablet computer, or other mobile computer device. The administrator 122 may be, for example, an application developer who leads a team of software engineers developing an application stored on the application server 120.

FIG. 1 shows a second application server 124 controlled by another administrator 126 using a computer 127. As one example, the application stored on the application server 124 may be an application used in running a business, such as an intranet website that provides differing levels of access to company financial data based on the identity or role of an end user. The administrator 126 in this example may set different levels of access according to company policy using computer 127 to enable each end user to access the appropriate application components and types of company financial data.

Also shown in FIG. 1 are a number of end users of the applications. The end users 130, 132, 134, 136 access the applications stored in application servers 120 and/or 124 via their computing devices 131, 133, 135, 137, such as a laptop computer, desktop computer, tablet computer, or other mobile computing device, for example.

Figure 2:
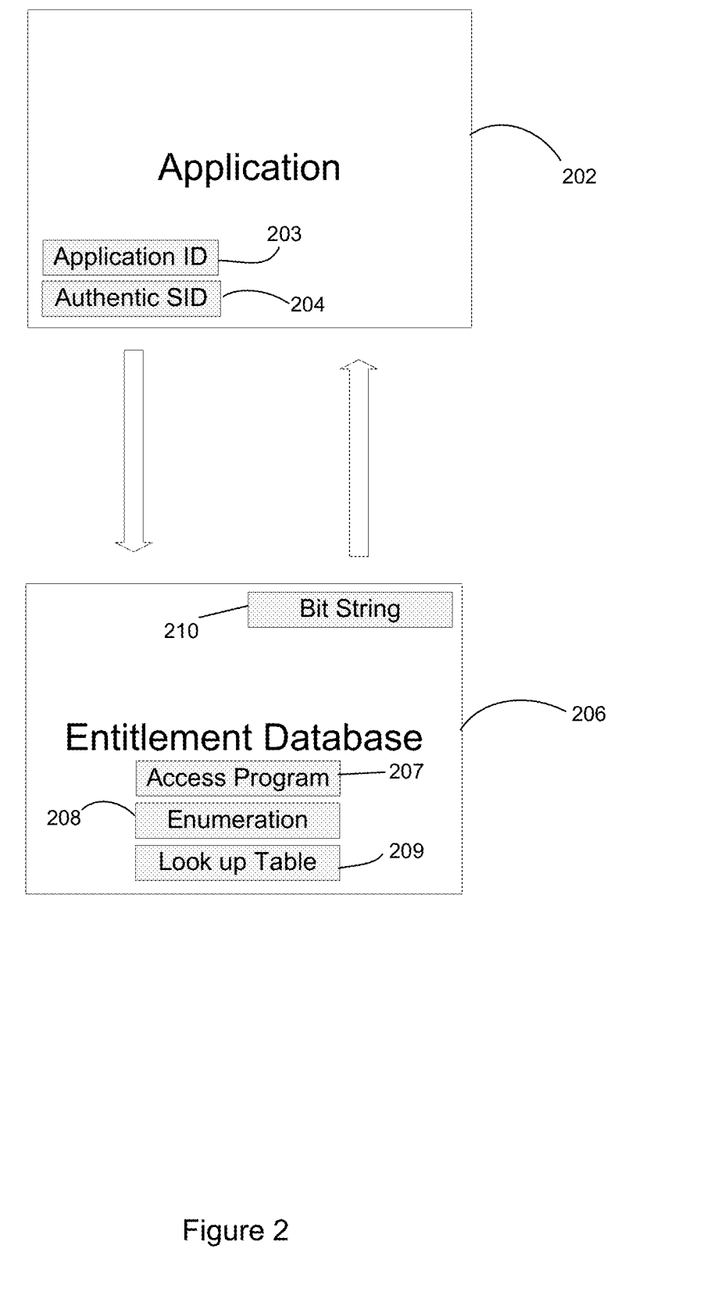
FIG. 2 is a diagram of an application and an entitlement database that can be used to control access to the application, according to an exemplary embodiment of the invention.

According to one embodiment of the invention, the application server 120, 124 stores an application and an entitlement database containing an access program that the administrator uses to control access to the application stored on the application server. The application 202, the entitlement database 206, and the access program 207 stored on the application server are depicted in FIG. 2. The application server may also store other proprietary software and data, such as software and data called or accessed by the application.

Initially, the administrator 122 determines and defines a set of entitlements that are needed for a particular application. The set of entitlements is typically defined with an enumeration or "enum," which may be a data type comprising a number of named values commonly referred to as elements. As shown in FIG. 2, the enumeration 208 is stored in the entitlement database 206 according to an exemplary embodiment of the invention.

Figure 3:
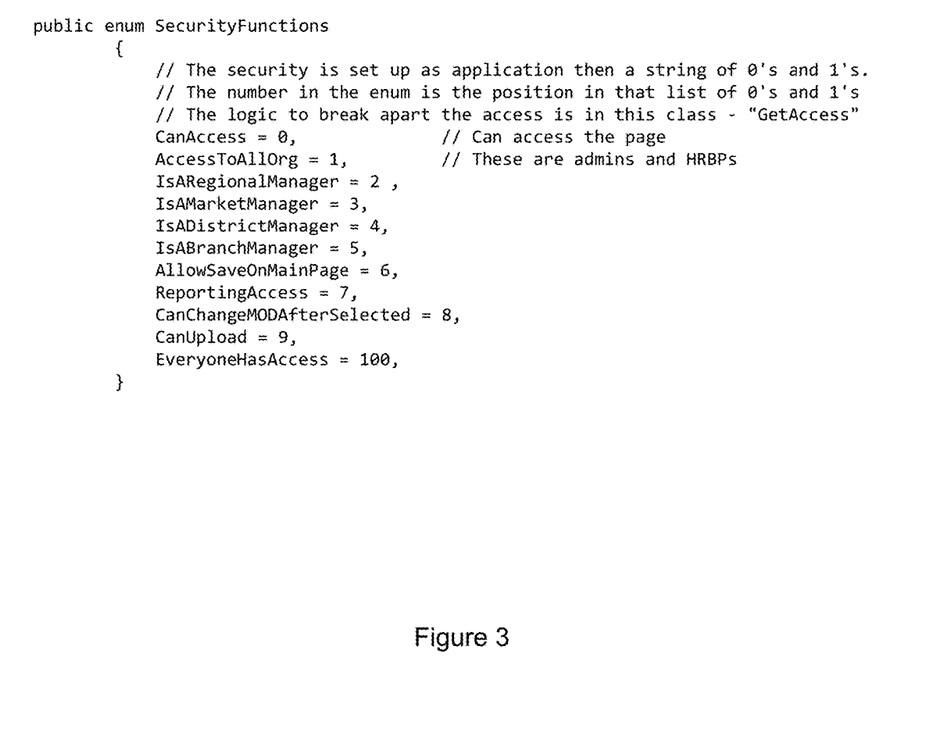
FIG. 3 shows an example of an enumeration that identifies various components of the application.

Examples of a set of entitlements for an application defined with an enumeration may include: access to a main page ("CanAccessMainPage"), access to application components for all organizations ("AccessToAllOrg"), access to application components for a regional manager ("IsARegionalManager"), access to application components for a market manager ("IsAMarketManager"), access to application components for a district manager ("IsADistrictManager"), access to application components for a branch manager ("IsABranch Manager"), permission to save changes on main page ("AllowSaveOnMainPage"), permission to access the reporting page ("ReportingAccess"), permission to change MOD after selected ("CanChangeMODAfterSelected"), and permission to upload ("CanUpload"). An example of this enumeration is shown in FIG. 3. In general, each entitlement may control access to a different component or components of the application 202 and associated data stored in the application server 120.

The access program 207 uses the enumeration 208 along with two other inputs to determine an end user's right to access various components of an application, according to an exemplary embodiment of the invention. The first input is an application ID. As shown in FIG. 2, the application ID 203 is stored with the application 202 and passed to the access program 207 in the entitlement database 206. The application ID may be an integer that is unique to and associated with a particular application. For example, for a system with 18 applications, the application ID may be an integer from 1 to 18. The second input is a security identifier ("SID") for the user. The SID may be an alphanumeric code that uniquely identifies an individual person within an organization. As shown in FIG. 2, the application 202 acquires an authenticated SID 204 of the user and passes the SID 204 along with the application ID 203 to the access program 207 in the entitlement database 206. The SID may be authenticated using single sign on (SSO), or by another authentication platform such as Janus, for example. The SID may also be authenticated by an authentication algorithm that is unique to or associated with the application. Typically, the authentication routine receives the SID and a password, and it verifies that these credentials are correct, thus verifying that the user owns the SID.

The access program 207 in the entitlement database receives the application ID and the authenticated SID as input and generates a bit string 210 corresponding to the application and the user. The bit string 210 includes a number of bits that correspond to the entitlements within the enumeration 208. According to one embodiment, the bit string 210 is an ordered list of ones and zeros (or other desired identifier), each of which corresponds to an entitlement in the enumeration 208, where "1" means access is authorized, and "0" means access is denied. For example, a bit string of 1000101100 for the enumeration example described above would mean that the user would be permitted to: access the main page ("CanAccessMainPage"), access application components for a district manager ("IsADistrictManager"), save changes on the main page ("AllowSaveOnMainPage"), and access certain reports ("ReportingAccess"). As the other bits are zeros (positions 2, 3, 4, 6, 9 and 10 in the bit string example above), access to those application components would be denied.

The access program 207 is passed the application ID 203 along with the authenticated SID 204. The access program 207 takes the authenticated SID 203 and looks up information such as job code, mail code and cost center from the company's common repository of employee information. This information may be expanded upon based on the needs of the application. The access program 207 then determines what method should be used to look up the bit string 210 based on a definition of entitlement stored in the AccV2SecurityStrings table within the entitlement database 206. Even if an entitlement is found using job code or mail code for example, a row in the AccV2SecurityStrings table identifying SID will take precedence according to a preferred embodiment of the invention. In this scenario, any SID can be proxied by another SID by first checking a proxy SID table, described below in connection with the AccV2Delegates table.

Figure 10:
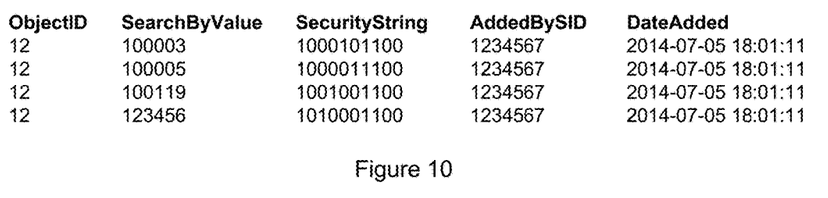
FIG. 10 is an example of the AccV2SecurityStrings table shown in FIG. 6.

After the access program has determined the appropriate identifier for the user (e.g., SID, job code, mail code, or cost center), the access program 207 looks up the user's bit string in a look-up table 209 stored in the entitlement database. The look up table 209 may be populated by the administrator 122, 126 as new users or groups are granted access to the application. An example of the look up table 209 is shown in FIG. 10. The access program then transmits the bit string 210, which specifies the components of the application that the user is permitted to access, to the application 202.

When the bit string is retrieved by the application 202 from the entitlement database 206, the application stores the bit string so that it will not have to go back to the entitlement database, since all the entitlements are contained within the bit string.

Figure 4:
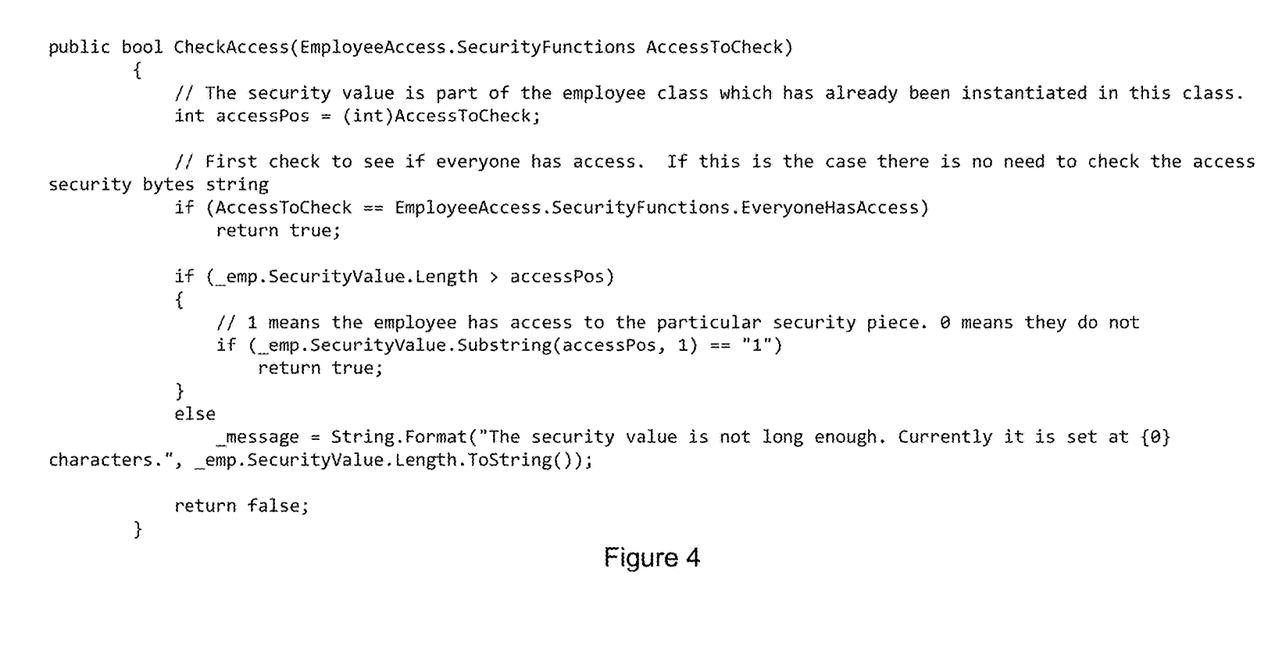
FIG. 4 is an example of a check access function that can be called to determine whether a user computing device has access to various components of an application.
Figure 5:
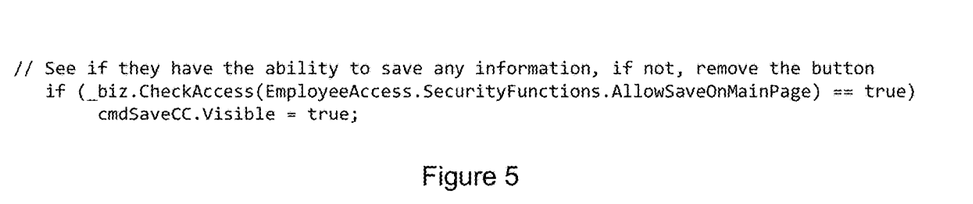
FIG. 5 is an example of a call to the check access function of FIG. 4.

When a user attempts to access the application 202 and the application needs to check an entitlement, it calls a check access function and returns a true or false value. The check access function uses the bit string to determine whether the user is authorized to access the requested component and if so, returns a "true" value. The application grants access only if "true" is returned. An example of the check access function is shown in FIG. 4. An example of a call to the check access function is shown in FIG. 5. One advantage that this embodiment can provide is that, other than defining the enumerations, the logic in FIG. 4 is the only logic needed to process the core of the bit string. When an entitlement is to be queried, it calls this code with the bit string in order to determine access.

As the application is developed over time, the administrator (e.g., the application developer) may need to create one or more entitlements to accommodate a new set of access rights, e.g., an entitlement comprising a new combination of application components. In such case, the administrator 122 or 126 can simply add a new entitlement to the enumeration 208 stored in the entitlement database, and add a "1" or a "0" to the bit string, e.g., at the end of the bit string for particular users. The administrator would also add new data to the look up table 209 specifying the access of various users to the new entitlement.

As one example, the administrator might add an entitlement "IsANationalManager=10" before the last entry in the enumeration shown in FIG. 3 along with a corresponding bit to the bit string 210 and data in the lookup table 209 granting this access to the appropriate user(s) or group(s). In this way, the administrator can easily and quickly create customized entitlements to specified components of an application, thus allowing specific users to access those rights promptly. The administrator can quickly add entitlements specific to an application and can control the granularity of the entitlement.

According to a preferred embodiment of the invention, an administrator interface can be provided to facilitate administration of the security strings and access rights. The administrator interface may allow for the appointment of a super user. After the super user is appointed, here or she is able to add applications to the entitlement system. The super user can associate one or more administrators with one or more applications. A communication (e.g., an email message) is generated to inform the administrator of his or her role. The communication may also include a link that the administrator can use to define entitlements for their end users. When the administrator follows the link to the administrator site, a list of applications administered by that administrator is presented. The administrator can define access rights to the one or more applications presented for one or more end users. The administrator selects an application and then defines what entitlements exist for the application. These entitlements are stored in the SecurityString value in the database, as shown in FIG. 10. Once the entitlement string is defined, the administrator can then define which end user has access to what application, or components thereof, for a given entitlement value.

Figure 6:
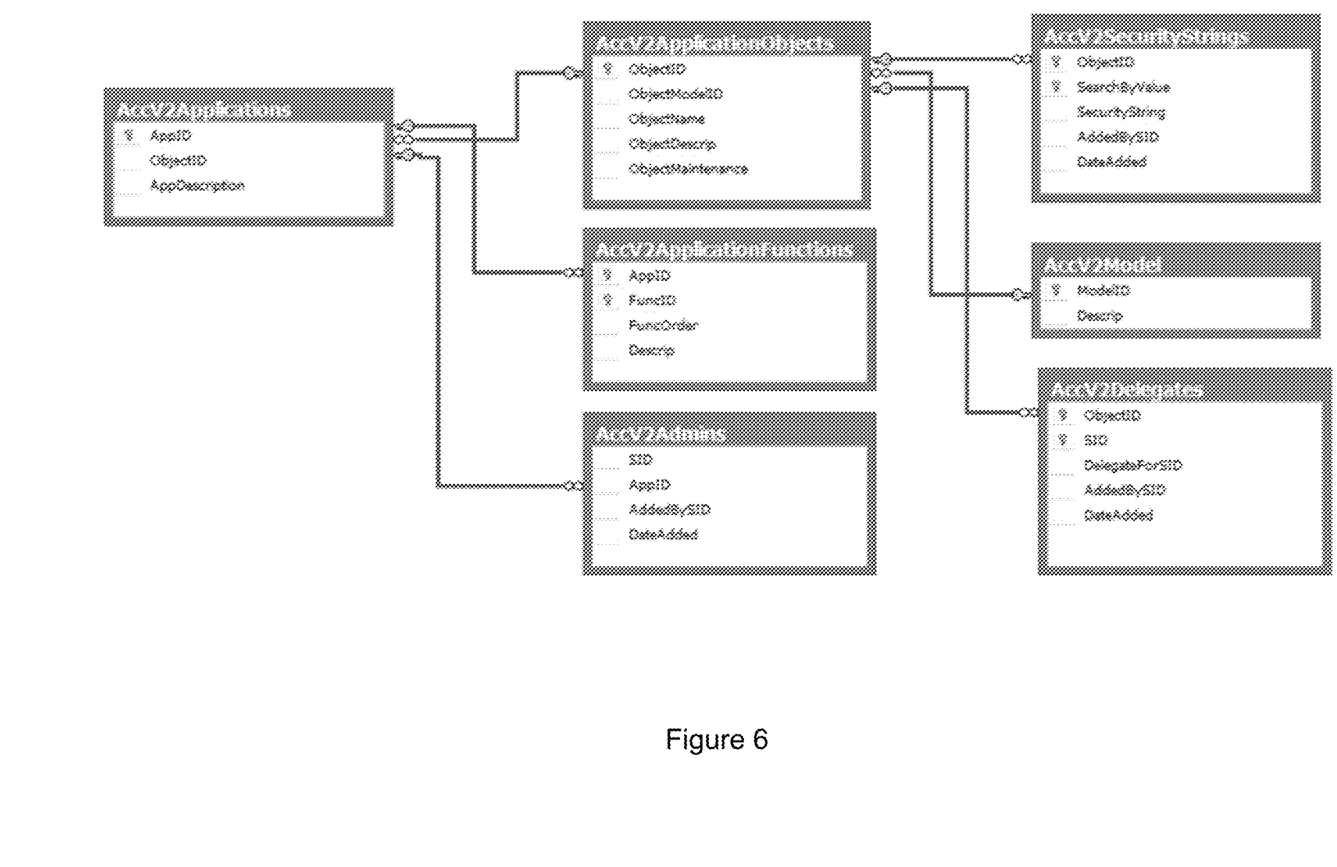
FIG. 6 depicts an example of the tables that can be used to control access to an application according to an exemplary embodiment of the invention.

FIG. 6 illustrates an example of tables that can be used in connection with administration of the entitlement database 206. In general, the tables in FIG. 6 provide a more detailed example of the components and operation of the entitlement database 206. The following paragraphs describe the tables according to one embodiment of the invention.

Figure 7:
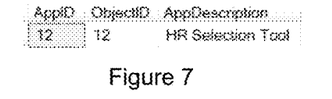
FIG. 7 is an example of the AccV2Application table shown in FIG. 6.
Figure 8:
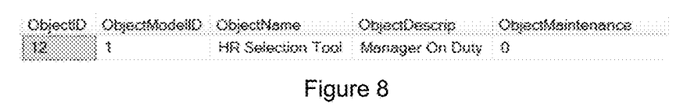
FIG. 8 is an example of the AccV2ApplicationObjects table shown in FIG. 6.

AccV2Applications Table. The AccV2Applications table defines each application at a high level. It contains a basic description of the application and is the source of the application ObjectID. The AppID is a unique ID provided to each application as it is onboarded. The ObjectID allows multiple levels of security to be applied within a single application. The AppDescription is a description of the application for reference purposes. An example of this table is shown in FIG. 7.

Figure 13:
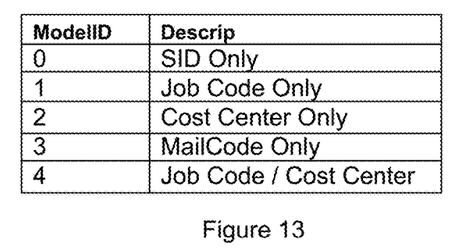
FIG. 13 is an example of the AccV2Model table shown in FIG. 6.

AccV2ApplicationObjects Table. The AccV2ApplicationObjects table associates the ObjectID with the different ModelIDs. An application can provide entitlements based on different object models which are stored in the AccV2Model table. ObjectID is the ID as defined in the AccV2Applications table. ObjectModelID defines how the application should view the security string. The values are defined in the AccV2Model table. ObjectName defines the ObjectID. ObjectDescrip contains a description of the ObjectID. FIG. 13 shows the contents of the AccV2Model table. An application would set a ModelID in order to define how an application would reference the SecurityString. For example, if ModelID 1 is used, the application would only reference the employee's job code to look up the SecurityString in the AccV2SecurityString table.

Figure 9:
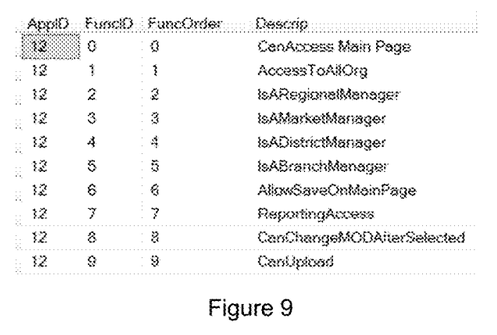
FIG. 9 is an example of the AccV2ApplicationFunctions table shown in FIG. 6.

AccV2ApplicationFunctions Table. When an application defines entitlements it does so at the bit level. This table contains the enumeration 208, which holds the order in which the bits should be assembled and provides a description of what each bit does for each application. AppID is a unique ID provided to each application as it is onboarded. FuncID is a unique ID that defines the bit function. FuncOrder provides the order in which the bit should be in. Descrip is a description of each bit. An example of this table is shown in FIG. 9.

Figure 11:
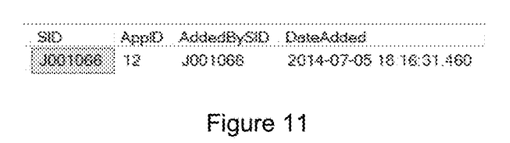
FIG. 11 is an example of the AccV2Admins table shown in FIG. 6.

AccV2SecurityStrings Table. This is the main look up table 209 from which the security string 210 is extracted. When the administrator creates the entitlement, it is stored as a single SecurityString 210 in this table. ObjectID is the ObjectID as defined in the AccV2Applications table. SearchByValue is the value to search for the security string based on the access model being used. The SearchByValue can be any one of the values listed in the AccV2Model table. In FIG. 13 are some examples of these values to be utilized. Once defined, the ModelID will allow the application to understand which component of the employee data should be utilized to obtain the SecurityString. SecurityString is the security string itself. AddedBySID is the SID of the employee who added the data to the table. DateAdded is the date on which the data was added. An example of this table is shown in FIG. 11.

AccV2Admins Table. This table identifies the people who can administer the bit strings 210. SID is the ID of the admin. AppID is a unique ID provided to each application as it is onboarded. AddedBySID is the SID of the employee who added the data to the table. DateAdded is the date on which the data was added. An example of this table in shown in FIG. 11.

Figure 12:
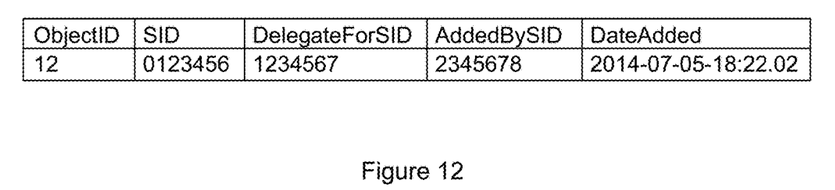
FIG. 12 is an example of the AccV2Delegates table shown in FIG. 6.

AccV2Delegates Table. It is possible to provide delegate access to any user who as an entitlement granted to them. This table stores the relationship between who has that delegated authority. ObjectID is the ObjectID as defined in the AccV2Applications table. SID is the ID of the employee who will have the rights of the employee defined in the DelegateForSID column. DelegateForSID is the SID of the employee being delegated. AddedBySID is the SID of the employee who added the data to the table. DateAdded is the date on which the data was added. An example of this table is shown in FIG. 12.

AccV2Model Table. The system can be set up to provide access by SID, Jobcode, Mailcode or a combination thereof. This table stores the combinations of the ways in which someone is authenticated. ModelID defines how the application should view the security string. Descrip is a description for the ModelID. An example of this table is shown in FIG. 13.

Another advantage that various embodiments of the system can provide is the ability to distribute reports to specified individuals or groups according to the bit string. The application may include a reporting module that generates a number of preformatted reports of varying sensitivities. The reporting module can be configured to control access to such reports. For example, when an individual with a SID visits the reporting module, it passes the appropriate application ID and authenticated SID to the entitlement database 206. The entitlement database then returns a bit string 210 specifying whether access will be granted to the individual to various reports. The reporting module will then show only the reports that the individual is permitted to access. The reporting module concept can be described as applying the bit mapping model to the reports themselves.

While the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. Communications network, e.g., 110, may also comprise a telephone communications network, such as the Public Switched Telephone Network (PSTN). In another embodiment, communication network 120 may comprise a Personal Branch Exchange (PBX), which may further connect to the PSTN.

Although examples of user communication devices 123, 127, 131, 133, 135, 137 are shown in FIG. 1, exemplary embodiments of the invention may utilize other types of communication devices, such as tablet computers or smartphones, whereby a user may interact with a network that transmits and delivers data and information used by the various systems and methods described herein. The user communication device may include a microprocessor, a microcontroller or other device operating under programmed control. The user communication device may further include an electronic memory such as a random access memory (RAM) or electronically programmable read only memory (EPROM), a storage (which is typically non-transitory) such as a hard drive, a CDROM or a rewritable CDROM or another magnetic, optical or other media, and other associated components connected over an electronic bus, as will be appreciated by persons skilled in the art. The user communication device may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The user communication device may also include a network-enabled appliance, a browser-equipped or other network-enabled cellular telephone, or another TCP/IP client or other device.

As described above, FIG. 1 includes a number of servers 120, 124 and user communication devices 123, 127, 131, 133, 135, 137, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, or simply software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the communication devices. As used herein, a user interface may include any hardware, software, or combination of hardware and software used by the processor that allows a user to interact with the processor of the communication device. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface is any device that provides communication between a user and a processor. The information provided by the user to the processor through the user interface may be in the form of a command, a selection of data, or some other input, for example.

As discussed above, a user interface is utilized by the processor that performs a set of instructions such that the processor processes data for a user. The user interface is typically used by the processor for interacting with a user either to convey information or receive information from the user. However, it should be appreciated that in accordance with some embodiments of the invention, it is not necessary that a human user actually interact with a user interface used by the processor. Rather, it is contemplated that the user interface of the invention might interact, i.e., convey and receive information, with another processor, rather than a human user.

Although the embodiments of the present invention have been described herein in the context of a particular implementation in a particular environment for a particular purpose, those skilled in the art will recognize that its usefulness is not limited thereto and that the embodiments of the present invention can be beneficially implemented in any number of environments for any number of purposes.

What is claimed is:

1. A computer-implemented method for controlling access by users of an organization to a plurality of components of a computer application, the computer implemented method implemented by a hardware processor comprising:

storing, in an electronic entitlement database, an enumeration that defines entitlement data and identifies the plurality of components of the computer application, wherein the entitlement data specifies access rights to the plurality of components for a user or a defined group of users;

storing, in the electronic entitlement database, an electronic lookup table containing the entitlement data;

receiving from a user of a computing device executing the computer application a request for access to at least one of the plurality of components of the computer application on the computing device, the request comprising a security identifier (SID) of the user or the defined group of users, an application identifier for the computer application, and an object identifier that specifies a plurality of security levels for the computer application;

determining authorization for the at least one of the plurality of components of the computer application based on the enumeration, the SID, the application identifier, and the object identifier;

generating an electronic bit string specifying access to the at least one of the plurality of components of the computer application, based on the SID and the application identifier, where each bit in the electronic bit string corresponds to the entitlement data defined by the enumeration and indicates authorization for the user or the defined group of users to access a respective component of the computer application, and an order of bits in the electronic bit string is based on an order of the entitlement data defined by the enumeration stored in the electronic entitlement database;

storing the electronic bit string in the electronic entitlement database in association with the SID, job code, mail code, or cost center; and transmitting the electronic bit string to the computer application;

wherein the computer application grants or denies the user of the computing device access to the at least one of the plurality of components of the computer application based on an associated bit in the electronic bit string.

2. The computer implemented method of claim 1, wherein the generating the electronic bit string further comprises using an access model to identify the electronic bit string, wherein the access model characterizes the user or the defined group of users according to at least one of: the SID, the job code, the cost center and the mail code.

3. The computer implemented method of claim 1, further comprising:
adding to the enumeration an additional component or combination of components of the computer application; and
adding an additional bit to the electronic bit string corresponding to the additional component or combination of components of the computer application.

4. The computer implemented method of claim 1, wherein the electronic bit string is used to determine access to predefined reports.

5. The computer implemented method of claim 1, wherein the access to the at least one of the plurality of components of the computer application on the computing device is granted using a check access function.

6. A computer-implemented system for controlling access by users of an organization to a plurality of components of a computer application comprising:
an electronic entitlement database; and
a hardware computer processor that is programmed to:
store, in the electronic entitlement database, an enumeration that defines entitlement data and identifies the plurality of components of the computer application, wherein the entitlement data specifies access rights to the plurality of components for a user or a defined group of users;

store, in the electronic entitlement database, an electronic lookup table containing the entitlement data;

receive from a user of a computing device executing the computer application a request for access to at least one of the plurality of components of the computer application on the computing device, the request comprising a security identifier (SID) of the user or the defined group of users, an application identifier for the computer application, and an object identifier that specifies a plurality of security levels for the computer application;

determine authorization for the at least one of the plurality of components of the computer application based on the enumeration, the SID, the application identifier, and the object identifier;

generate an electronic bit string specifying access to the at least one of the plurality of components of the computer application, based on the SID and the application identifier, where each bit in the electronic bit string corresponds to the entitlement data defined by the enumeration and indicates authorization for the user or the defined group of users to access a component of the computer application, and an order of the bits in the electronic bit string is based on an order of the entitlement data defined by the enumeration stored in the electronic entitlement database;

store the electronic bit string in the electronic entitlement database in association with the SID, job code, mail code, or cost center; and transmit the electronic bit string to the computer application;

wherein the computer application grants or denies to the user of the computing device access to the at least one of the plurality of components of the computer application based on an associated bit in the electronic bit string.

7. The computer implemented system of claim 6, wherein the hardware computer processor, in generating the electronic bit string, is programmed to use an access model to identify the electronic bit string, wherein the access model characterizes the user or the defined group of users according to at least one of: the SID, the job code, the cost center and the mail code.

8. The computer implemented system of claim 6, wherein the hardware computer processor is programmed to:
add to the enumeration an additional component or combination of components of the computer application; and
add an additional bit to the electronic bit string corresponding to the additional component or combination of components of the computer application.

9. The computer implemented system of claim 6, wherein the hardware computer processor is programmed to use the electronic bit string to determine access to predefined reports.

10. The computer implemented system of claim 6, wherein the hardware computer processor is programmed to use a check access function to grant access or deny access to the at least one of the plurality of components of the computer application on the computing device of the user.

11. A non-transitory computer readable medium containing program instructions for controlling access by users of an organization to a plurality of components of a computer application, wherein execution of the program instructions by one or more processors of a computer system causes the one or more processors to carry out the steps of:

storing, in an electronic entitlement database, an enumeration that defines entitlement data and identifies the plurality of components of the computer application, wherein the entitlement data specifies access rights to the plurality of components for a user or a defined group of users;

storing, in the electronic entitlement database, an electronic lookup table containing the entitlement data;

receiving from a user of a computing device executing the computer application a request for access to at least one of the plurality of components of the computer application on the computing device, the request comprising a security identifier (SID) of the user or the defined group of users, an application identifier for the computer application, and an object identifier that specifies a plurality of security levels for the computer application;

determining authorization for the at least one of the plurality of components of the computer application based on the enumeration, the SID, the application identifier, and the object identifier;

generating an electronic bit string specifying access to the at least one of the plurality of components of the computer application, based on the SID and the application identifier, where each bit in the electronic bit string corresponds to the entitlement data defined by the enumeration and indicates authorization for the user or the defined group of users to access for a respective component of the computer application, and an order of bits in the electronic bit string is based on an order of the entitlement data defined by the enumeration stored in the electronic entitlement database;

storing the electronic bit string in the electronic entitlement database in association with the SID, job code, mail code, or cost center; and     transmitting the electronic bit string to the computer application; and     wherein the computer application grants or denies to the user of the computing device access to the at least one of the plurality of components of the computer application based on an associated bit in the electronic bit string.

12. The non-transitory computer readable medium of claim 11, wherein execution of the program instructions by the one or more processors of the computer system causes the one or more processors, in generating the electronic bit string, to use an access model to identify the electronic bit string, wherein the access model characterizes the user or the defined group of users according to at least one of: the SID, the job code, the cost center and the mail code.

13. The non-transitory computer readable medium of claim 11, wherein execution of the program instructions by the one or more processors of the computer system causes the one or more processors to:

add to the enumeration an additional component or combination of components of the computer application; and     add an additional bit to the electronic bit string corresponding to the additional component or combination of components of the computer application.

14. The non-transitory computer readable medium of claim 11, wherein execution of the program instructions by the one or more processors of the computer system causes the one or more processors to use the electronic bit string to determine access to predefined reports.

15. The non-transitory computer readable medium of claim 11, wherein execution of the program instructions by the one or more processors of the computer system causes the one or more processors to use a check access function in granting access.

* * * * *